United States Patent
Schmidt et al.

(10) Patent No.: US 11,879,498 B2
(45) Date of Patent: Jan. 23, 2024

(54) ROTOR DAMPING DEVICES FOR A TURBOMACHINE

(71) Applicant: General Electric Company, Schenectady, NY (US)

(72) Inventors: Richard Schmidt, Loveland, OH (US); Narayanan Payyoor, Bangalore (IN); Peeyush Pankaj, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/140,925

(22) Filed: Jan. 4, 2021

(65) Prior Publication Data

US 2022/0213793 A1 Jul. 7, 2022

(51) Int. Cl.
*F16C 27/04* (2006.01)
*F01D 5/26* (2006.01)
*F01D 25/16* (2006.01)

(52) U.S. Cl.
CPC .............. *F16C 27/045* (2013.01); *F01D 5/26* (2013.01); *F01D 25/164* (2013.01); *F05D 2260/96* (2013.01)

(58) Field of Classification Search
CPC .... F16C 27/045; F16C 27/04; F16C 2360/23; F16C 2360/24; F01D 25/162; F01D 25/164; F05D 2260/96
See application file for complete search history.

(56) References Cited

U.S. PATENT DOCUMENTS

| | | | | |
|---|---|---|---|---|
| 3,901,557 A | * | 8/1975 | Daniels | F01D 25/164 384/627 |
| 4,971,458 A | * | 11/1990 | Carlson | F01D 25/164 384/99 |
| 6,325,546 B1 | * | 12/2001 | Storace | F01D 25/164 384/624 |
| 8,083,413 B2 | | 12/2011 | Ertas | |
| 8,136,999 B2 | | 3/2012 | Mons et al. | |
| 8,262,353 B2 | | 9/2012 | Storace | |
| 8,662,756 B2 | | 3/2014 | Care et al. | |
| 9,482,274 B2 | | 11/2016 | Ertas et al. | |
| 9,599,152 B2 | | 3/2017 | Freeman et al. | |
| 9,797,304 B2 | | 10/2017 | Daimer | |
| 9,926,975 B2 | | 3/2018 | Smedresman et al. | |

(Continued)

OTHER PUBLICATIONS

Choudhry et al., Design Equations for Wire Mesh Bearing Dampers in Turbomachinery, ASME Turbo Expo 2005 Power for Land, Sea, GT2005-68641, American Society of Mechanical Engineers, 2005, pp. 807-814. (Abstract Only) https://doi.org/10.1115/GT2005-68641.

(Continued)

*Primary Examiner* — Topaz L. Elliott
*Assistant Examiner* — Michael K. Reitz
(74) *Attorney, Agent, or Firm* — Dority & Manning, P.A.

(57) ABSTRACT

A rotor damping device for a turbomachine is provided. The rotor damping device includes a first fluid damper; and a second damper in communication with the first fluid damper, the second damper comprising a wire mesh, wherein the first fluid damper is transitionable between a working condition and an interruption condition, and wherein, during the interruption condition, the wire mesh of the second damper dampens vibration of the turbomachine.

13 Claims, 10 Drawing Sheets

(56) References Cited

U.S. PATENT DOCUMENTS

| | | |
|---|---|---|
| 10,050,579 B2 | 8/2018 | Bauer |
| 10,240,529 B2 | 3/2019 | Savela |
| 10,274,017 B2 | 4/2019 | Ganiger et al. |
| 2002/0063368 A1 | 5/2002 | Kabir |
| 2015/0267740 A1* | 9/2015 | Ryu ................... F16C 17/035 384/103 |
| 2017/0122369 A1* | 5/2017 | Smedresman ........ F16C 27/045 |
| 2017/0276173 A1* | 9/2017 | Smedresman ........ F01D 25/164 |

OTHER PUBLICATIONS

Ertas et al., Dynamic Characteristics of Shape Memory Alloy Metal Mesh Dampers, AIAA-2009-2521, 50$^{th}$ AIAA/ASME/ASCE/AHS/ASC Structures, Structural Dynamics and Materials Conference 17$^{th}$ AIAA/ASME/AHS/ASC, May 4-7, 2009, p. 1-8.

* cited by examiner

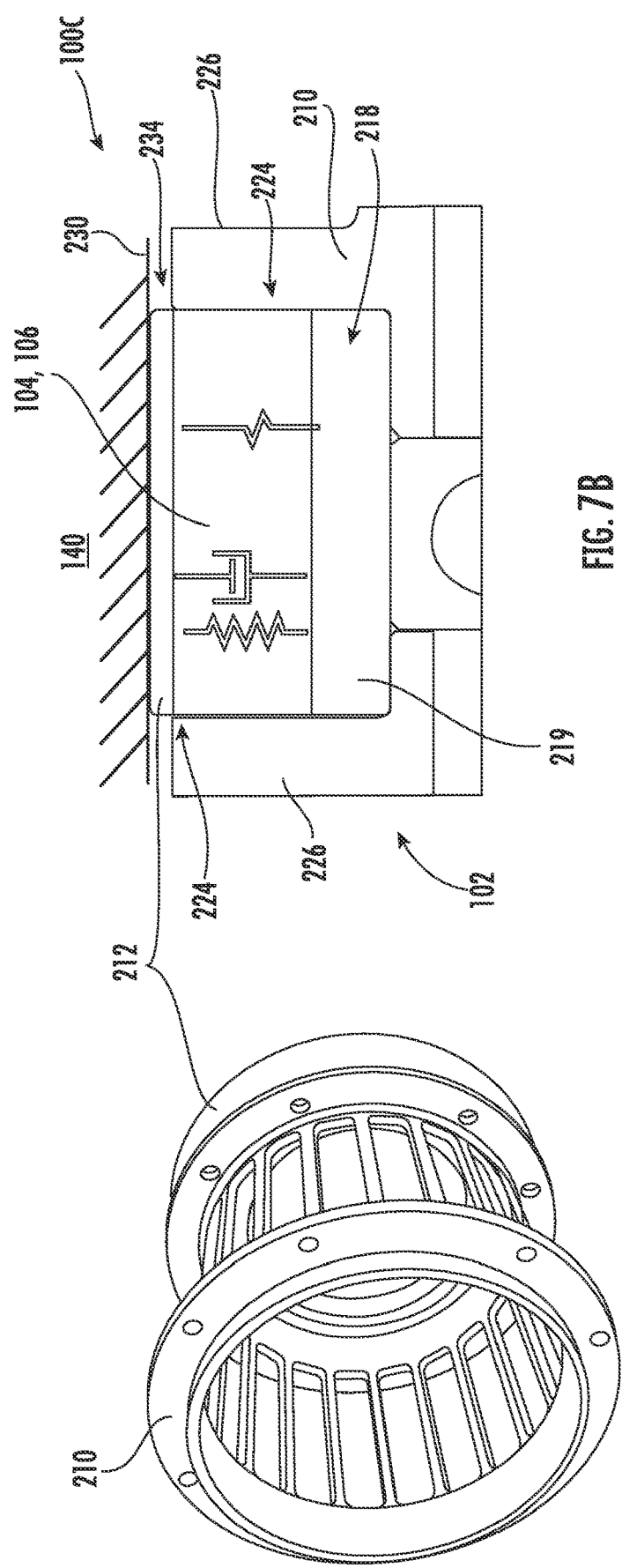

ROTOR DAMPING DEVICES FOR A TURBOMACHINE

FIELD

The present subject matter relates generally to a turbomachine or a gas turbine engine, or more particularly to a rotor damping device for a turbomachine.

BACKGROUND

Fluid film journal bearings have long been used to dampen the vibration created by turbomachines. Rotors in aircraft gas turbine engines and industrial centrifugal compressors often use squeeze film damper bearings supported by spring bars to reduce the amount of vibration transmitted from the rotor to the supporting structure. In a fluid film bearing, a thin fluid film forms a buffer between the rotating journal surface and the stationary bearing surface, and dampens vibration from the rotor. In a squeeze film damper bearing, a thin film of fluid is squeezed by two non-rotating cylindrical surfaces. One surface is stationary while the other is positioned by a spring bar support structure and oscillates with the motion of the rotor. The squeezing of the fluid film dampens rotor vibration through the bearing support.

Damping the vibration in a turbomachine provides quiet and comfortable operation of the machine, reduced fatigue stress on the machine and its supports, and a safeguard to the damage that can be caused by unstable vibration. Vibration in a turbomachine is usually caused by a rotating mass imbalance, e.g., rotor, or by aerodynamic forces within the turbine and/or compressor. These vibrations are not static, but vary with the operating speed and operating characteristics of the turbomachine. Turbomachine vibration has a dynamic range that varies in magnitude and frequency with the operating speed of the turbomachine.

Conventional systems only having a single fluid damper can be made ineffective when a fluid, such as oil, runs out; when vibrations are so high that the fluid damper bottoms out; and/or when oil viscosity is very high during cold temperatures causing the damper to become more rigid.

BRIEF DESCRIPTION

Aspects and advantages of the invention will be set forth in part in the following description, or may be obvious from the description, or may be learned through practice of the invention.

In one exemplary embodiment of the present disclosure, a rotor damping device for a turbomachine is provided. The rotor damping device includes a first fluid damper; and a second damper in communication with the first fluid damper, the second damper comprising a wire mesh, wherein the first fluid damper is transitionable between a working condition and an interruption condition, and wherein, during the interruption condition, the wire mesh of the second damper dampens vibration of the turbomachine.

In certain exemplary embodiments the second damper is in parallel configuration with the first fluid damper.

In certain exemplary embodiments the second damper is in series configuration with the first fluid damper.

In certain exemplary embodiments the rotor damping device includes a sidewall portion between a static structure, wherein the wire mesh is contained within the sidewall portion to constrain axial deflection and apply a preload.

In certain exemplary embodiments the rotor damping device includes a ball bearing mounted on a first portion of a squirrel cage and a roller bearing mounted on a second portion of the squirrel cage.

In certain exemplary embodiments the first fluid damper includes a film of fluid squeezed between a first non-rotating surface and a second non-rotating surface.

In certain exemplary embodiments the film of fluid is oil.

In certain exemplary embodiments the first fluid damper includes a damper housing having an outer rim, an inner rim, and a first cavity defined between the outer rim and the inner rim.

In certain exemplary embodiments a damper oil is contained within the first cavity and the wire mesh is contained within the first cavity immersed in the damper oil.

In certain exemplary embodiments the wire mesh is metal.

In certain exemplary embodiments the first fluid damper further includes a second cavity spaced apart from the first cavity.

In certain exemplary embodiments a damper oil is contained within the first cavity and the wire mesh is contained within the second cavity.

In certain exemplary embodiments the wire mesh is a shape memory material.

In certain exemplary embodiments the first fluid damper transitions to the interruption condition when a fluid runs out or when bottomed out.

In another exemplary embodiment of the present disclosure, a rotor damping device for a turbomachine is provided. The rotor damping device includes a first fluid damper comprising a damper housing having an outer rim, an inner rim, and a first cavity defined between the outer rim and the inner rim; and a second damper in communication with the first fluid damper, the second damper comprising a wire mesh, wherein the first fluid damper is transitionable between a working condition and an interruption condition, and wherein, during the interruption condition, the wire mesh of the second damper dampens vibration of the turbomachine.

In certain exemplary embodiments a damper oil is contained within the first cavity and the wire mesh is contained within the first cavity immersed in the damper oil.

In certain exemplary embodiments the wire mesh is metal.

In certain exemplary embodiments the first fluid damper further includes a second cavity spaced apart from the first cavity.

In certain exemplary embodiments a damper oil is contained within the first cavity and the wire mesh is contained within the second cavity.

In an exemplary aspect of the present disclosure, a method is provided for damping vibration of a turbomachine. The method includes providing a rotor damping device comprising a first fluid damper and a second damper in communication with the first fluid damper, the second damper comprising a wire mesh, wherein the first fluid damper is transitionable between a working condition and an interruption condition; and damping vibration of the turbomachine with the second damper during the interruption condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 7A is a perspective view of a squirrel cage of a rotor damping device in accordance with another exemplary embodiment of the present disclosure.

FIG. 7B is a schematic, cross-sectional view of a third exemplary rotor damping device in accordance with another exemplary embodiment of the present disclosure.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
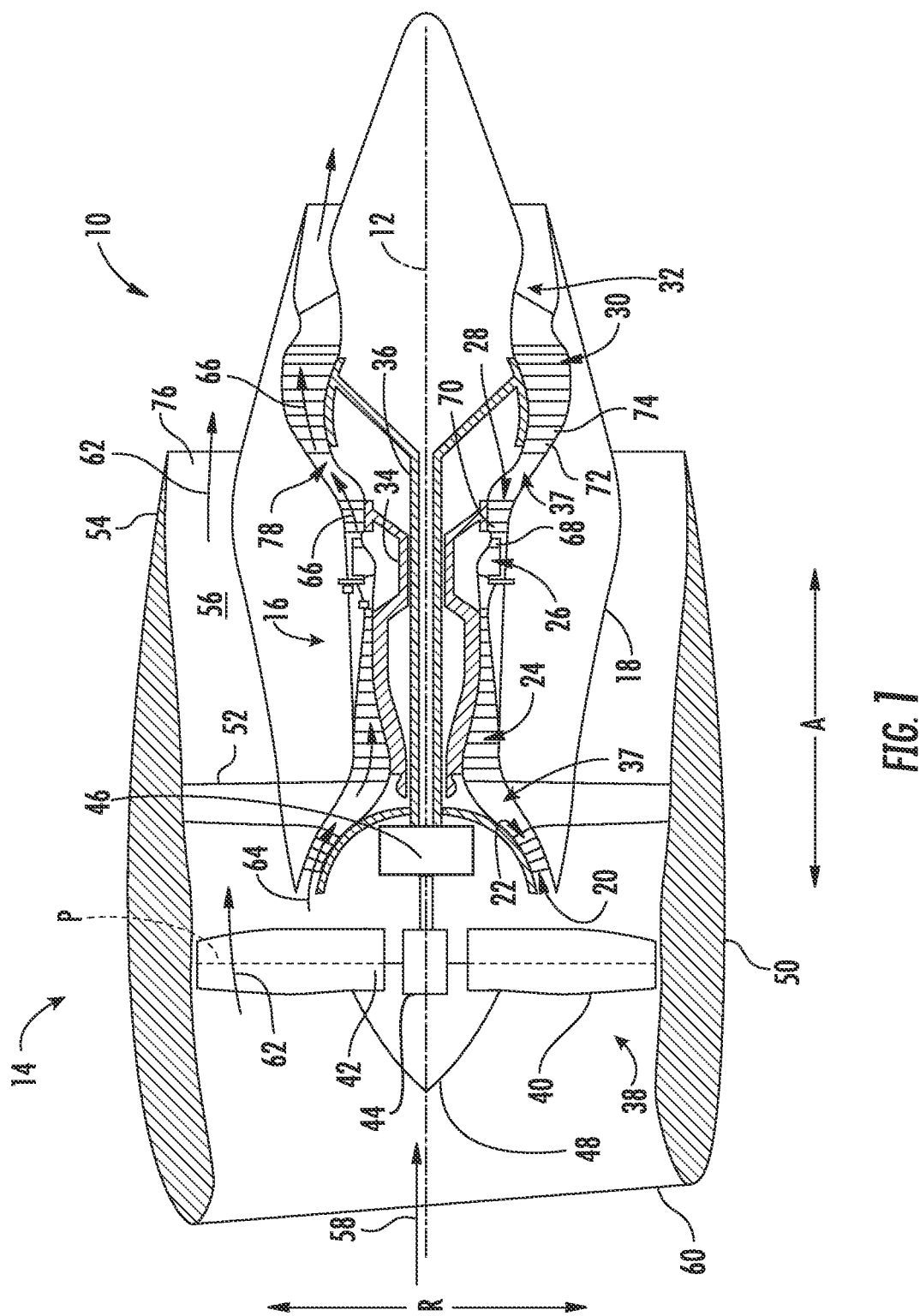
FIG. 1 is a schematic, cross-sectional view of an exemplary gas turbine engine in accordance with exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A rotor damping device of the present disclosure includes a first fluid damper and a second damper in communication with the first fluid damper. Systems only having a single fluid damper can be made ineffective when a fluid, such as oil, runs out and/or when vibrations are so high that the fluid damper bottoms out. In other words, a first fluid damper is transitionable between a working condition, i.e., a condition in which the first fluid damper dampens vibration of the turbomachine, and an interruption condition, i.e., when the first fluid damper ineffectively dampens vibration of the turbomachine.

Accordingly, a rotor damping device of the present disclosure further includes a second damper in communication with the first fluid damper. In this manner, during any interruption condition of the first fluid damper, the second damper dampens vibration of the turbomachine.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or axis 12 provided for reference) and a radial direction R. In general, the turbofan 10 includes a fan section 14 and a turbomachine 16 disposed downstream from the fan section 14. Exemplary rotor damping devices 100 of the present disclosure are compatible with rotor components of an exemplary turbomachine 16 of engine 10 of FIG. 1.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Additionally, the compressor section, combustion section 26, and turbine section together define at least in part a core air flowpath 37 extending therethrough. Each compressor 22, 24 may, in turn, include one or more rows of stator vanes interdigitated with one or more rows of compressor rotor blades. Moreover, each turbine 28, 30 may, in turn, include one or more rows of stator vanes interdigitated with one or more rows of turbine rotor blades.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed. In an exemplary embodiment of the present disclosure, the fan 14 may include a number of rotor stages, each of which includes a row of fan blades or rotor airfoils mounted to a rotor having a rotatable disk. The fan 14 may also include at least one stator stage including a row of stationary or stator airfoils that serve to turn the airflow passing therethrough. As used herein, the term "fan" refers to any apparatus in a turbine engine having a rotor with airfoils operable to produce a fluid flow. It is contemplated that the principles of the present invention are equally applicable to multi-stage fans, single-stage fans, and other fan configurations; as well as with low-bypass turbofan engines, high-bypass turbofan engines, and other engine configurations.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is, for the embodiment depicted, supported relative to the turbomachine 16 by a plurality of circumferentially-spaced outlet guide vanes 52. Additionally, a downstream section 54 of the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may be a direct drive turbofan engine (i.e., not including the power gearbox 46), may include a fixed pitch fan 38, etc. Additionally, or alternatively, aspects of the present disclosure may be incorporated into any other suitable gas turbine engine, such as a turboshaft engine, turboprop engine, turbojet engine, open rotor or unducted turbofan engine, a land-based gas turbine engine for power generation, an aeroderivative gas turbine engine, etc.

Referring to FIGS. 2A-10C, exemplary rotor damping devices 100 of the present disclosure include a first fluid damper 102 and a second damper 104 in communication with the first fluid damper 102.

However, systems only having a single fluid damper can be made ineffective when a fluid, such as oil, runs out; when vibrations are so high that the fluid damper bottoms out; and/or when oil viscosity is very high during cold temperatures causing the damper to become more rigid. In other words, the first fluid damper 102 is transitionable between a working condition, i.e., a condition in which the first fluid damper 102 dampens vibration of the turbomachine 16, and an interruption condition, i.e., when the first fluid damper 102 ineffectively dampens vibration of the turbomachine 16.

Accordingly, a rotor damping device 100 of the present disclosure further includes a second damper 104 in communication with the first fluid damper 102. In this manner, during any interruption condition of the first fluid damper 102, the second damper 104 dampens vibration of the turbomachine 16.

Figure 2A:
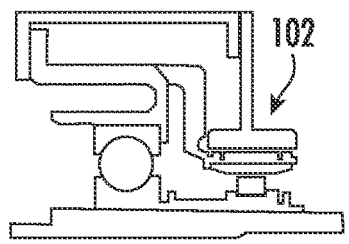
FIG. 2A is a schematic, cross-sectional view of a first fluid damper of a rotor damping device in accordance with exemplary embodiments of the present disclosure.
Figure 2B:
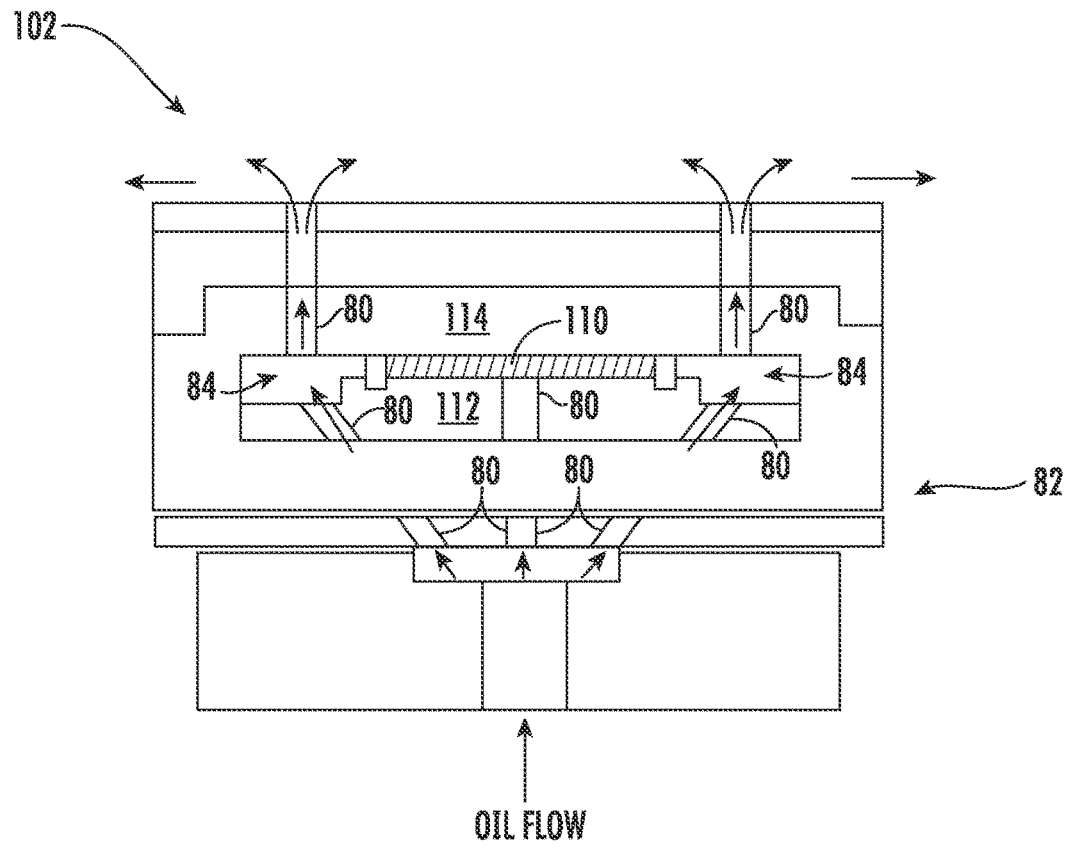
FIG. 2B is a schematic, cross-sectional view of a first fluid damper of a rotor damping device in accordance with exemplary embodiments of the present disclosure.

Referring now to FIGS. 2A and 2B, an exemplary embodiment of a first fluid damper 102 will now be described. The first fluid damper 102 provides a first damping portion of the rotor damping device 100 of the present disclosure and is used to dampen the vibration created by turbomachine 16.

In some exemplary embodiments, the first fluid damper 102 includes a film of fluid 110 squeezed between a first non-rotating surface 112 and a second non-rotating surface 114. In an exemplary embodiment, the film of fluid 110 is oil. The first fluid damper 102 of the present disclosure may comprise a squeeze film damper supported by spring bars to reduce the amount of vibration transmitted from the rotor to the supporting structure.

Referring to FIG. 2B, the thin fluid film 110 forms a buffer between the first non-rotating surface 112 and the second non-rotating surface 114, and dampens vibration from the rotor. For example, the thin film of fluid 110 may be squeezed by two non-rotating cylindrical surfaces. One surface is stationary while the other is positioned by a spring bar support structure and oscillates with the motion of the rotor. The squeezing of the fluid film dampens rotor vibration through the bearing support.

Referring to FIG. 2B, in an exemplary embodiment, a first fluid damper 102 includes a fluid film 110 formed between a first surface 112, e.g., an inside surface of a squeeze film cylinder and a second surface 114, e.g., an inside surface of a spring support. The first fluid damper includes fluid ports 80 of the assembly that pass fluid directly to the fluid film 110 through the annular stationary ring assembly 82. Just inside of the squeeze film cylinder are two annular fluid plenums 84 that receive fluid from fluid ports 80.

The fluid film 110 acts as a squeeze film vibration damper. The energy adsorbed in forcing oil in and out of the squeeze film dampens vibration. In some exemplary embodiments, when a bearing spring support flexes with respect to the squeeze film, oil is pushed out or drawn into the squeeze films. The movement of oil in and out of the squeeze film adsorbs energy and, thus, dampens vibration.

However, systems only having a single fluid damper can be made ineffective when a fluid, such as oil, runs out; when vibrations are so high that the fluid damper bottoms out; and/or when oil viscosity is very high during cold temperatures causing the damper to become more rigid.

In other words, the first fluid damper 102 is transitionable between a working condition, i.e., a condition in which the first fluid damper 102 dampens vibration of the turbomachine 16, and an interruption condition, i.e., when the first fluid damper 102 ineffectively dampens vibration of the turbomachine 16.

Accordingly, referring to FIGS. 2A-10C, rotor damping devices 100 of the present disclosure further include a second damper 104 in communication with the first fluid damper 102. In this manner, during any interruption condition of the first fluid damper 102, the second damper 104 dampens vibration of the turbomachine 16.

Figure 3:
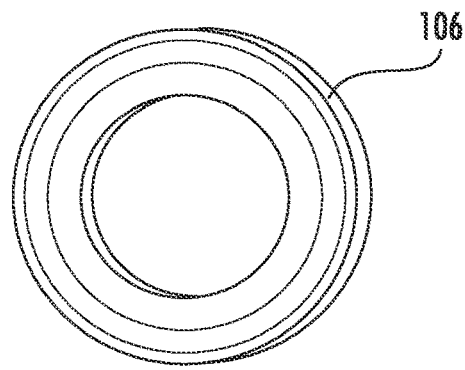
FIG. 3 is a perspective view of a wire mesh of a second fluid damper of a rotor damping device in accordance with exemplary embodiments of the present disclosure.

Referring to FIG. 3, the second damper 104 of the present disclosure includes a wire mesh 106. In some exemplary embodiments, the wire mesh 106 of the present disclosure may be formed of a conventional material. In other exemplary embodiments, the wire mesh 106 of the present disclosure may be formed of a metal material. In further exemplary embodiments, the wire mesh 106 of the present disclosure may be formed of a special material like shape memory materials.

The wire mesh 106 of the present disclosure may be an oil-free integral wire mesh damper. The wire mesh 106 may be a knitted wire mesh including a metal wire or plastic strand knitted into a mesh structure. The knitting process produces mesh of interlocking loops. These loops can move relative to each other in the same plane without distorting the mesh, giving the knitted mesh a two-way stretch. Because each loop acts as a small spring when subjected to tensile or compressive stress, knitted metal has an inherent resiliency. Knitted metal also provides high mechanical oil-free damping characteristics and non-linear spring rates. Vibration and mechanical shock can be effectively controlled to eliminate the violent resonant conditions and provide ample protection from dynamic overloads. The wire mesh 106 of the present disclosure may provide at least thirty times the damping as compared to a conventional air foil bearing. It is contemplated that the wire mesh 106 of the present disclosure may also be formed from a variety of materials, such as steel, Inconel, aluminum, copper, tantalum, platinum, polypropylene, nylon, polyethylene, and the like. The density and dimensions of the wire mesh 106 can be adjusted to meet a particular design application.

Figure 4:
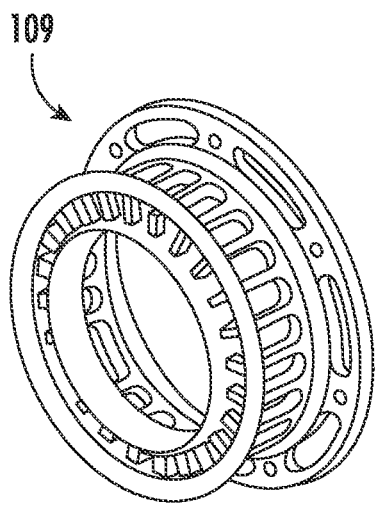
FIG. 4 is a perspective view of a squirrel cage of a rotor damping device in accordance with exemplary embodiments of the present disclosure.

Referring to FIG. 4, the rotor damping device 100 may be incorporated with a squirrel cage 109. The squirrel cage 109 takes up axial load and may be the primary element that makes up the bearing support stiffness.

Referring to FIGS. 5A-5E, in an exemplary embodiment, a rotor damping device 100A includes a second damper 104 that is in parallel configuration with a first fluid damper 102. Referring to FIG. 5A-5E, the rotor damping device 100A includes a first fluid damper 102 and a second fluid damper 104 mounted on a squirrel cage 109 and a static structure 139 in parallel configuration. Furthermore, the rotor damping device 100A includes a stator portion 140, a ball bearing 142 mounted on a first portion 146 of the squirrel cage 109, a roller bearing 144 mounted on a second portion 148 of the squirrel cage 109, and a sidewall portion 150 extending between the static structure 139.

Figure 5A:
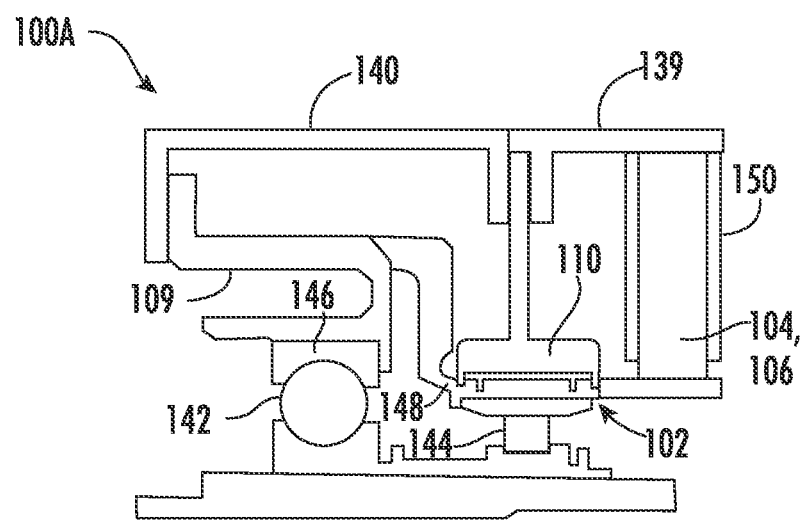
FIG. 5A is a schematic, cross-sectional view of a first exemplary rotor damping device in a parallel configuration in normal operation in accordance with an exemplary embodiment of the present disclosure.

Referring to FIG. 5A, in a first configuration of the rotor damping device 100A, the first fluid damper 102 is in a working condition and is dampening vibration of the turbomachine 16. In this configuration, the second damper 104 provides a supplemental damping which can be helpful, for example, during hot day starts of the engine 10 (FIG. 1).

Figure 5B:
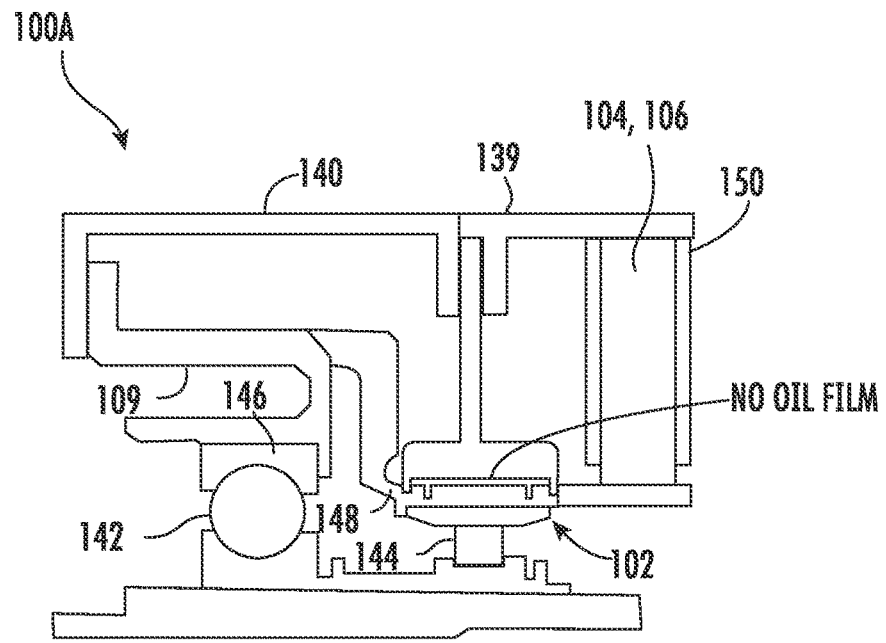
FIG. 5B is a schematic, cross-sectional view of a first exemplary rotor damping device in a parallel configuration in oil starved operation in accordance with an exemplary embodiment of the present disclosure.

Referring to FIG. 5B, in a second configuration of the rotor damping device 100A, the first fluid damper 102 is in an interruption condition, e.g., the first fluid damper is oil starved and ineffectively dampens vibration of the turbomachine 16. In this configuration, the second damper 104 provides a backup damping system that is able to effectively dampen vibrations of the turbomachine 16. In such a configuration, referring to FIGS. 5D and 5E, the backup damping of the second damper 104 is provided according to the deflection of the wire mesh 106 within the sidewall portion 150. For example, the wire mesh 106 is contained within the sidewall portion 150 to constrain axial deflection and apply a preload for optimum damping.

Figure 5C:
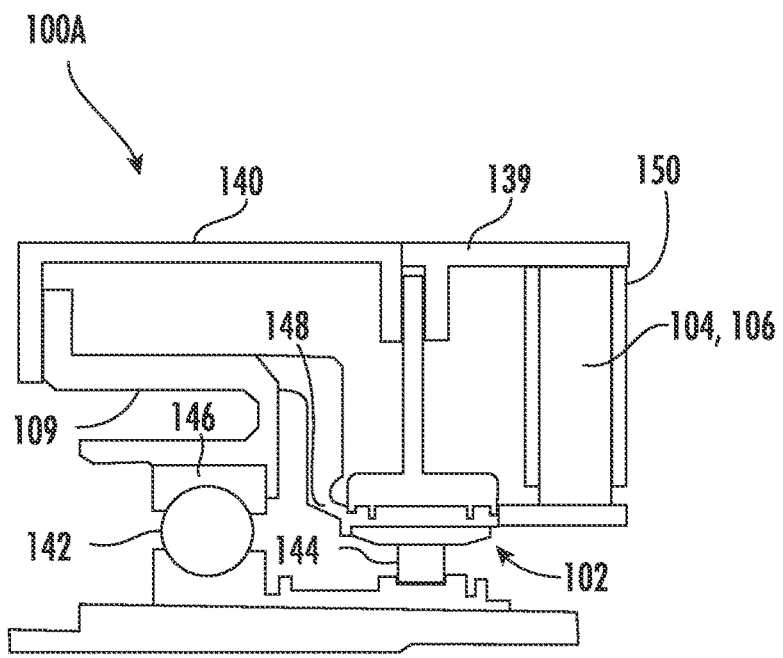
FIG. 5C is a schematic, cross-sectional view of a first exemplary rotor damping device in a parallel configuration in a bottomed out operation in accordance with an exemplary embodiment of the present disclosure.
Figure 5D:
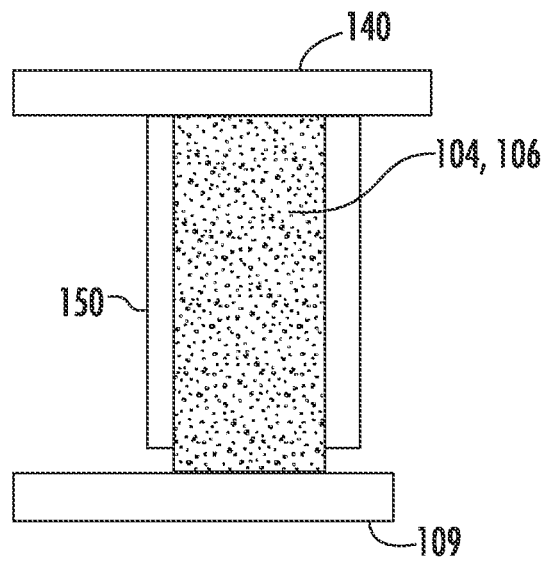
FIG. 5D is a schematic, cross-sectional view of a wire mesh of a first exemplary rotor damping device in a first configuration in accordance with an exemplary embodiment of the present disclosure.
Figure 5E:
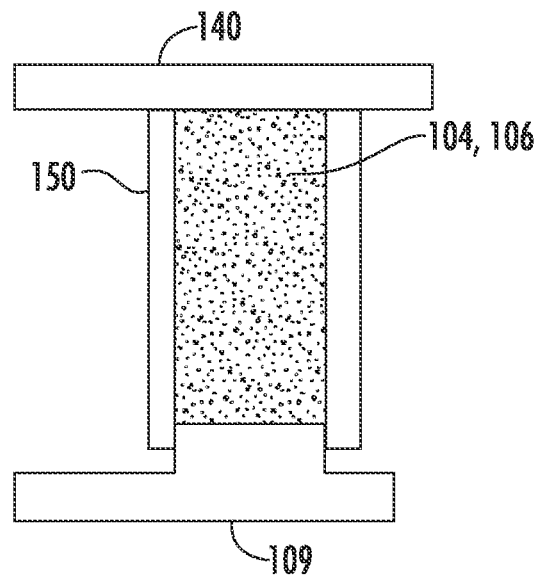
FIG. 5E is a schematic, cross-sectional view of a wire mesh of a first exemplary rotor damping device in a second configuration in accordance with an exemplary embodiment of the present disclosure.

Referring to FIG. 5C, in a third configuration of the rotor damping device 100A, the first fluid damper 102 is in an interruption condition, e.g., the first fluid damper is bottomed out and ineffectively dampens vibration of the turbomachine 16. In this configuration, the second damper 104 provides a backup damping system that is able to effectively dampen vibrations of the turbomachine 16. In such a configuration, the backup damping of the second damper 104 is provided even when the first fluid damper 102 is fused.

Figure 6A:
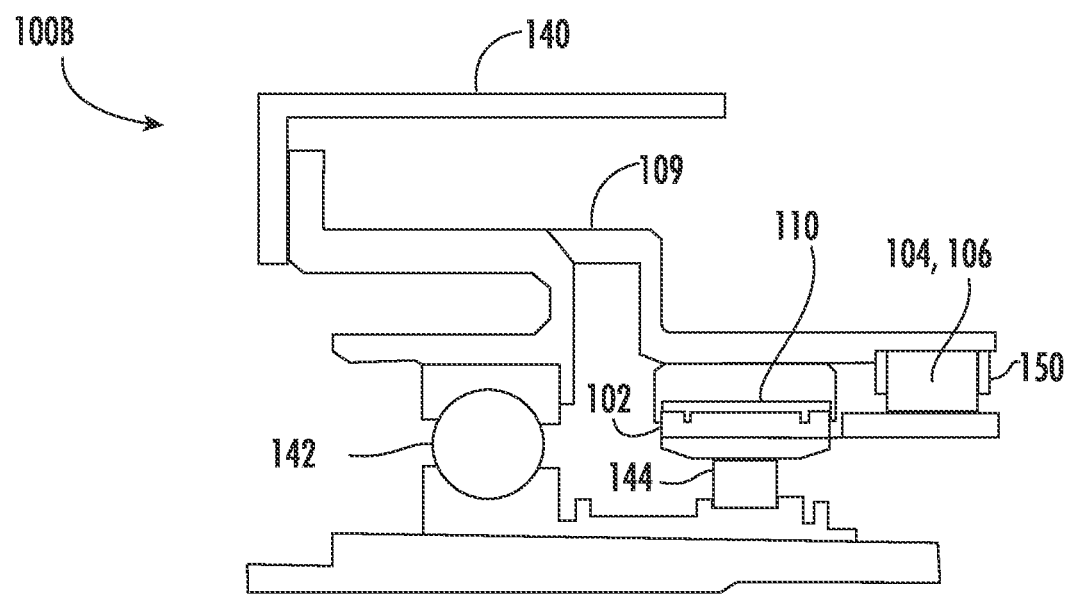
FIG. 6A is a schematic, cross-sectional view of a second exemplary rotor damping device in a series configuration in normal operation in accordance with another exemplary embodiment of the present disclosure.
Figure 6B:
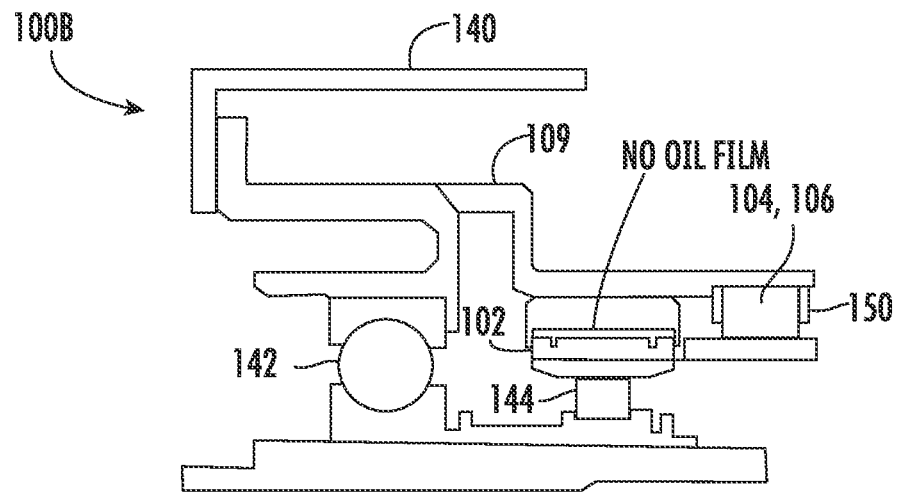
FIG. 6B is a schematic, cross-sectional view of a second exemplary rotor damping device in a series configuration in oil starved operation in accordance with another exemplary embodiment of the present disclosure.
Figure 6C:
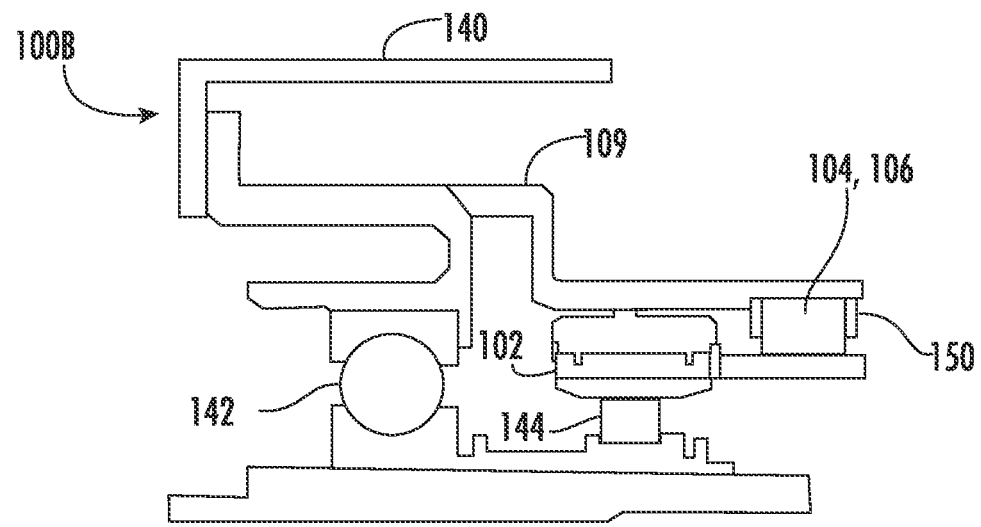
FIG. 6C is a schematic, cross-sectional view of a second exemplary rotor damping device in a series configuration in a bottomed out operation in accordance with another exemplary embodiment of the present disclosure.

Referring to FIGS. 6A-6C, in another exemplary embodiment, a rotor damping device 100B includes a second damper 104 that is in series configuration with a first fluid damper 102. Referring to FIG. 6A-6C, the rotor damping device 100B includes a first fluid damper 102 and a second fluid damper 104 mounted on a squirrel cage 109 in series configuration. Furthermore, the rotor damping device 100B includes a stator portion 140, a ball bearing 142 mounted on a first portion 146 of the squirrel cage 109, a roller bearing 144 mounted on a second portion 148 of the squirrel cage 109, and a sidewall portion 150 extending between the squirrel cage 109.

Referring to FIG. 6A, in a first configuration of the rotor damping device 100B, the first fluid damper 102 is in a working condition and is dampening vibration of the turbomachine 16. In this configuration, the second damper 104 provides a supplemental damping and allows for a larger first fluid damper 102 gap.

Referring to FIG. 6B, in a second configuration of the rotor damping device 100B, the first fluid damper 102 is in an interruption condition, e.g., the first fluid damper is oil starved and ineffectively dampens vibration of the turbomachine 16. In this configuration, the second damper 104 provides a backup damping system that is able to effectively dampen vibrations of the turbomachine 16. In such a configuration, referring to FIG. 6B, the backup damping of the second damper 104 is able to dampen the turbomachine 16 as much as the larger gap will allow.

Referring to FIG. 6C, in a third configuration of the rotor damping device 100B, the first fluid damper 102 is in an interruption condition, e.g., the first fluid damper is bottomed out and ineffectively dampens vibration of the turbomachine 16.

Figure 10A:
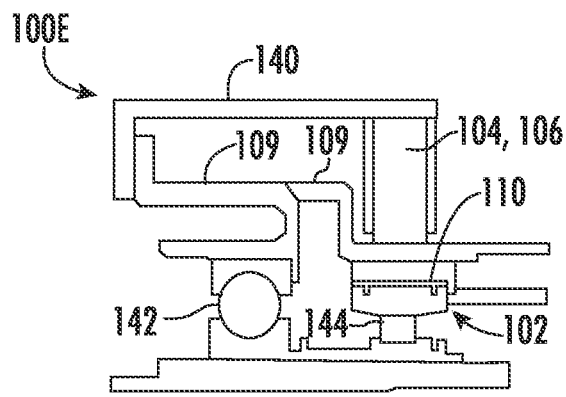
FIG. 10A is a schematic, cross-sectional view of a fifth exemplary rotor damping device in a configuration in normal operation in accordance with another exemplary embodiment of the present disclosure.
Figure 10B:
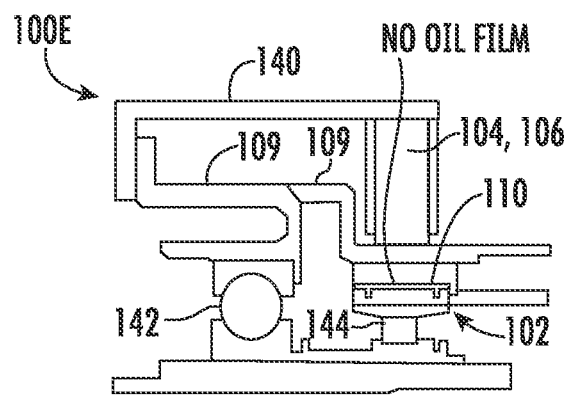
FIG. 10B is a schematic, cross-sectional view of a fifth exemplary rotor damping device in a configuration in oil starved operation in accordance with another exemplary embodiment of the present disclosure.
Figure 10C:
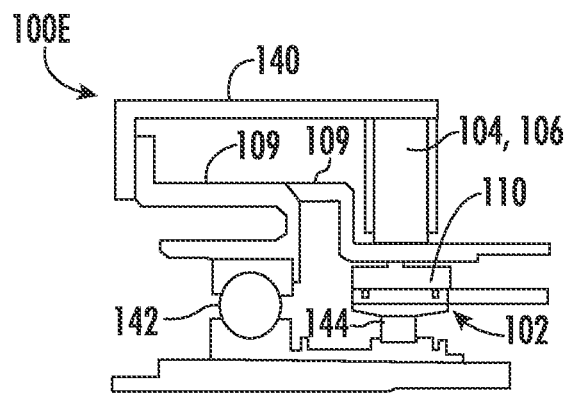
FIG. 10C is a schematic, cross-sectional view of a fifth exemplary rotor damping device in a configuration in a bottomed out operation in accordance with another exemplary embodiment of the present disclosure.

Referring to FIGS. 10A-10C, in another exemplary embodiment, a rotor damping device 100E includes a squirrel cage 109 and a second damper 104 in a parallel configuration and a first fluid damper 102 in a series configuration. In such a configuration, the first fluid damper 102 is uncentered and mounted directly on bearing 144. Referring to FIG. 10C, in this configuration, the second damper 104 provides a backup damping system that is able to provide additional dampening of vibrations of the turbomachine 16 during a bottomed out or cold temperature condition.

Figure 7C:
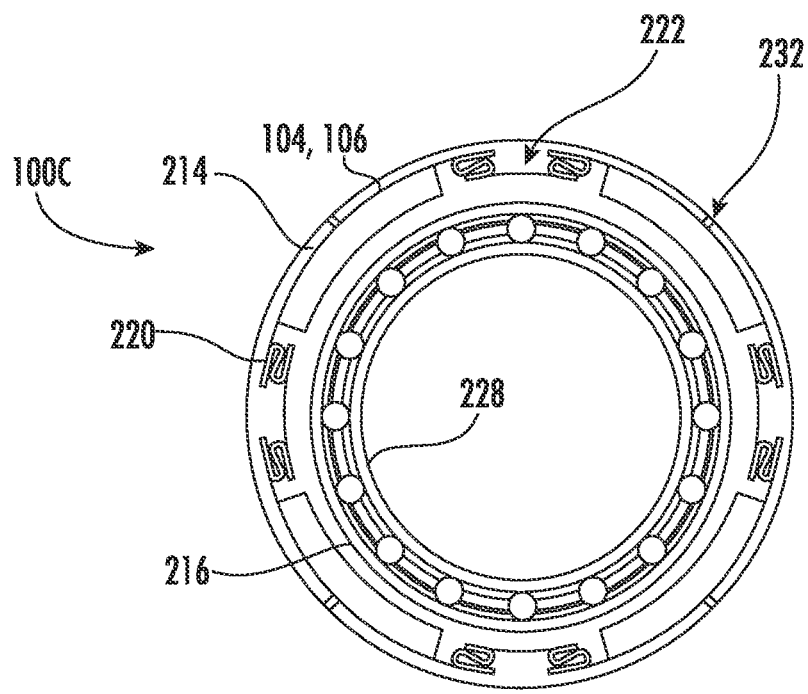
FIG. 7C is a schematic, cross-sectional view of a third exemplary rotor damping device in accordance with another exemplary embodiment of the present disclosure.
Figure 7D:
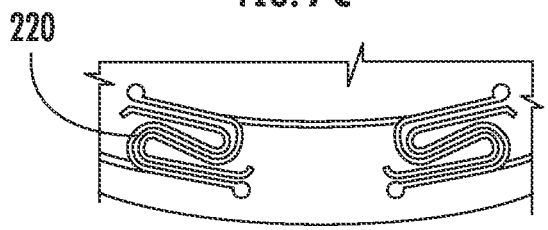
FIG. 7D is a schematic, cross-sectional view of a third exemplary rotor damping device in accordance with another exemplary embodiment of the present disclosure.
Figure 7E:
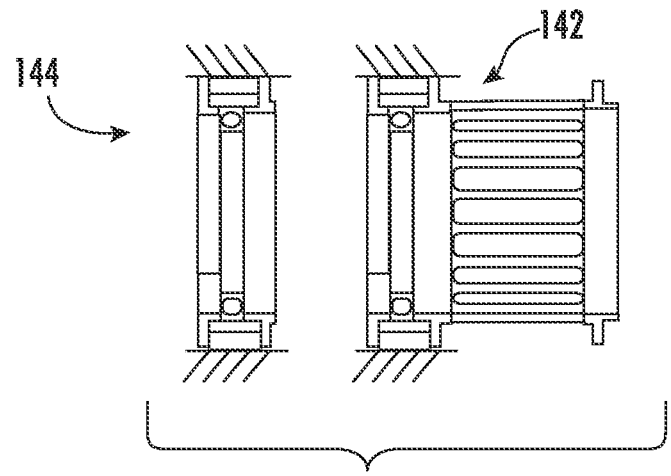
FIG. 7E is a schematic, cross-sectional view of a third exemplary rotor damping device in accordance with another exemplary embodiment of the present disclosure.

Referring to FIGS. 7A-7E, in another exemplary embodiment, a rotor damping device 100C includes a second damper 104 that is in configuration with a first fluid damper 102. Referring to FIG. 7B, the rotor damping device 100C of the present disclosure includes a wire mesh 106 that is contained within the same cavity as a damper oil and the wire mesh 106 is within the cavity immersed in the damper oil as described in detail below.

Referring to FIG. 7A-7C, the rotor damping device 100C includes a first fluid damper 102 and a second fluid damper 104 mounted on a squirrel cage 210. In this embodiment, the squirrel cage 210 takes up axial load and is the primary element that makes up the bearing support stiffness.

Referring to FIGS. 7A-7E, the rotor damping device 100C includes a squirrel cage 210, a damper housing 212 having an outer rim 214, an inner rim 216, a first cavity 218 defined between the outer rim 214 and the inner rim 216, damper oil 219 contained within the first cavity 218, integral springs 220, wire mesh portions 106, an inner stop portion 222, damper end seals 224, end seals 226, angular contact ball bearings 228, an outer stop portion 230, oil feed ports 232, and an oil exit portion 234. Referring to FIG. 7B, the damper oil 219 is contained within the first cavity 218 and the wire mesh 106 is contained within the first cavity 218 immersed in the damper oil 219.

The damper housing 212 includes the integral springs 220 and wire mesh segments 106. The outer rim 214 may float within a bore of the housing 212 and allows for thermal axial growth and has a tight clearance radially. The outer rim 214 is held stationary and requires anti-rotation when not connected a portion of the squirrel cage 210. The inner rim 216 vibrates and whirls due to rotodynamic shaft unbalance. This interfaces with the roller bearing 144. The integral springs 220 segments the damper land preventing or blocking circumferential flow and also contributes to the radial stiffness of the device. The springs 220 are in parallel with the squirrel cage 210.

Referring to FIGS. 7A-7E, the rotor damping device 100C combines a first fluid damper 102, e.g., a segmented squeeze film damper or integral squeeze film damper, and a second fluid damper 104 including a wire mesh 106. In such an embodiment, the wire mesh 106 may be formed of metal mesh damper segments. Advantageously, the wire mesh 106 is located in the same axial locations and in the same radial envelop as the first fluid damper 102, e.g., the wire mesh 106 is located in the same first cavity 218 as the damper oil 219 and is submersed in the damper oil 219. By using metal mesh damper segments to form the wire mesh 106, the wire mesh 106 is porous and therefore oil will flow through the wire mesh 106 and out the end seals 226 which control the damping through the damper end seal clearance 224. In exemplary embodiments, the second fluid damper 104 is in a parallel configuration with the first fluid damper 102.

Figure 8:
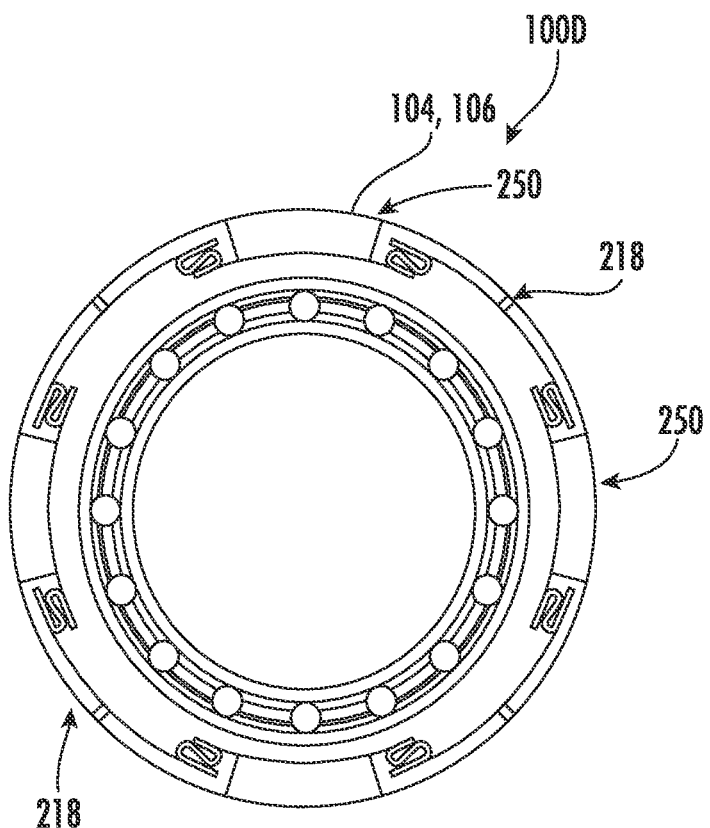
FIG. 8 is a schematic, cross-sectional view of a fourth exemplary rotor damping device in accordance with another exemplary embodiment of the present disclosure.
Figure 9:
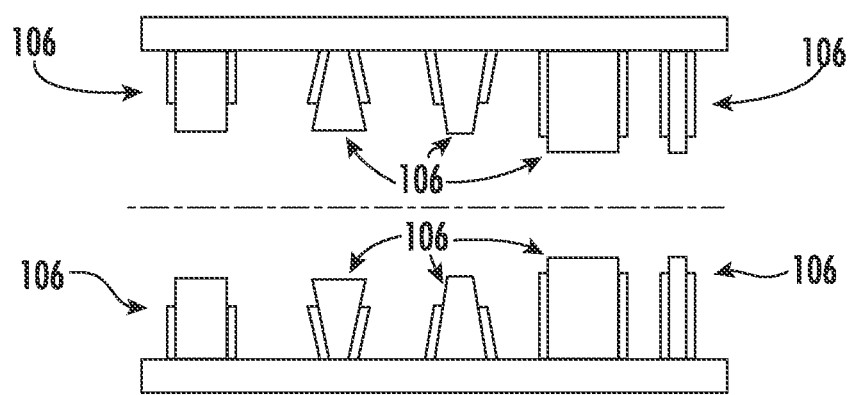
FIG. 9 is a schematic, cross-sectional view of a variety of different wire mesh geometrical shapes in accordance with exemplary embodiments of the present disclosure.

Referring to FIG. 8, the rotor damping device 100D includes a first fluid damper 102 and a second fluid damper 104 mounted on a squirrel cage 210. The difference with rotor damping device 100D shown in FIG. 8 is that the wire mesh portions 106 are not contained in the same cavity as the first fluid damper 102.

Referring to FIG. 8, the rotor damping device 100D includes a damper housing 212 having an outer rim 214, an inner rim 216, and a first cavity 218 defined between the outer rim 214 and the inner rim 216. However, in the embodiment of FIG. 8, the rotor damping device 100D further includes a second cavity 250 spaced apart from the first cavity 218. In such an embodiment, the damper oil 219 is contained within the first cavity 218 and the wire mesh 106 is contained within the second cavity 250 and is separate and apart from the damper oil 219.

In the embodiments discussed above with respect to FIGS. 7A-7E, the wire mesh 106 is contained within the first cavity 218 immersed in the damper oil 219. Thus, the exemplary embodiment shown in FIG. 8 is similar to the embodiments of FIGS. 7A-7E except that the wire mesh 106 is not in the same cavity of the first fluid damper 102. The wire mesh 106 occupies its own cavity 250 or circumferential slow thereby decreasing the angular span of the first fluid damper 102.

Referring to the exemplary embodiments shown in FIGS. 5A-8, the wire mesh portions 106 are shown having a rectangular cross-sectional shape. However, it is contemplated that the wire mesh portions 106 of the present disclosure can have any other geometric cross-sectional shapes for a variety of different applications and advantages. For example, referring to FIG. 9, the wire mesh portions 106 may have any geometrical cross-sectional shape for a variety of different applications including the following design parameters: (A) inner diameter width and height; (B) outer diameter width and height; (C) height of a support wall; (D) mesh density (stiffness to damping ratio); (E) axial preload; (F) general shape and/or profile; and (G) any other desired design parameters.

In an exemplary aspect of the present disclosure, a method is provided for damping vibration of a turbomachine. The method includes providing a rotor damping device comprising a first fluid damper and a second damper in communication with the first fluid damper, the second damper comprising a wire mesh, wherein the first fluid damper is transitionable between a working condition and an interruption condition; and damping vibration of the turbomachine with the second damper during the interruption condition.

Further aspects of the invention are provided by the subject matter of the following clauses:

1. A rotor damping device for a turbomachine, comprising: a first fluid damper; and a second damper in communication with the first fluid damper, the second damper comprising a wire mesh, wherein the first fluid damper is transitionable between a working condition and an interruption condition, and wherein, during the interruption condition, the wire mesh of the second damper dampens vibration of the turbomachine.

2. The rotor damping device of any preceding clause, wherein the second damper is in parallel configuration with the first fluid damper.

3. The rotor damping device of any preceding clause, wherein the second damper is in series configuration with the first fluid damper.

4. The rotor damping device of any preceding clause, further comprising: a sidewall portion between a static structure, wherein the wire mesh is contained within the sidewall portion to constrain axial deflection and apply a preload.

5. The rotor damping device of any preceding clause, further comprising: a ball bearing mounted on a first portion of a squirrel cage; and a roller bearing mounted on a second portion of the squirrel cage.

6. The rotor damping device of any preceding clause, wherein the first fluid damper includes a film of fluid squeezed between a first non-rotating surface and a second non-rotating surface.

7. The rotor damping device of any preceding clause, wherein the film of fluid is oil.

8. The rotor damping device of any preceding clause, wherein the first fluid damper includes a damper housing having an outer rim, an inner rim, and a first cavity defined between the outer rim and the inner rim.

9. The rotor damping device of any preceding clause, wherein a damper oil is contained within the first cavity and the wire mesh is contained within the first cavity immersed in the damper oil.

10. The rotor damping device of any preceding clause, wherein the wire mesh is metal.

11. The rotor damping device of any preceding clause, wherein the first fluid damper further includes a second cavity spaced apart from the first cavity.

12. The rotor damping device of any preceding clause, wherein a damper oil is contained within the first cavity and the wire mesh is contained within the second cavity.

13. The rotor damping device of any preceding clause, wherein the wire mesh is a shape memory material.

14. The rotor damping device of any preceding clause, wherein the first fluid damper transitions to the interruption condition when a fluid runs out or when bottomed out.

15. A rotor damping device for a turbomachine, comprising: a first fluid damper comprising a damper housing having an outer rim, an inner rim, and a first cavity defined between the outer rim and the inner rim; and a second damper in communication with the first fluid damper, the second damper comprising a wire mesh, wherein the first fluid damper is transitionable between a working condition and an interruption condition, and wherein, during the interruption condition, the wire mesh of the second damper dampens vibration of the turbomachine.

16. The rotor damping device of any preceding clause, wherein a damper oil is contained within the first cavity and the wire mesh is contained within the first cavity immersed in the damper oil.

17. The rotor damping device of any preceding clause, wherein the wire mesh is metal.

18. The rotor damping device of any preceding clause, wherein the first fluid damper further includes a second cavity spaced apart from the first cavity.

19. The rotor damping device of any preceding clause, wherein a damper oil is contained within the first cavity and the wire mesh is contained within the second cavity.

20. A method for damping vibration of a turbomachine, the method comprising: providing a rotor damping device comprising a first fluid damper and a second damper in communication with the first fluid damper, the second damper comprising a wire mesh, wherein the first fluid damper is transitionable between a working condition and an interruption condition; and damping vibration of the turbomachine with the second damper during the interruption condition.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A rotor damping device for a turbomachine, comprising:
   a first fluid damper;
   a second damper in communication with the first fluid damper, the second damper comprising a wire mesh;
   a sidewall portion radially inside a static structure; and
   a squirrel cage configured to take up an axial load, the second damper mounted on the squirrel cage,
   wherein the first fluid damper transitions between a working condition in which the first fluid damper dampens vibration of the turbomachine and an interruption condition in which the first fluid damper does not dampen vibration of the turbomachine,
   wherein, during the interruption condition, the wire mesh of the second damper dampens vibration of the turbomachine; and
   wherein the wire mesh is contained within the sidewall portion to constrain axial deflection and apply a preload,
   wherein the second damper is in parallel configuration with the first fluid damper.

2. The rotor damping device of claim 1, further comprising:
   a ball bearing mounted on a first portion of the squirrel cage; and
   a roller bearing mounted on a second portion of the squirrel cage.

3. The rotor damping device of claim 1, wherein the first fluid damper includes a film of fluid squeezed between a first non-rotating surface and a second non-rotating surface.

4. The rotor damping device of claim 3, wherein the film of fluid is oil.

5. The rotor damping device of claim 1, wherein the first fluid damper includes a damper housing having an outer rim, an inner rim, and a first cavity defined between the outer rim and the inner rim.

6. The rotor damping device of claim 5, wherein a damper oil is contained within the first cavity and the wire mesh is contained within the first cavity immersed in the damper oil.

7. The rotor damping device of claim 6, wherein the wire mesh is metal.

8. The rotor damping device of claim 1, wherein the wire mesh is a shape memory material.

9. The rotor damping device of claim 1, wherein the first fluid damper transitions to the interruption condition when a fluid runs out or when bottomed out.

10. A rotor damping device for a turbomachine, comprising:
    a first fluid damper comprising a damper housing having an outer rim, an inner rim, and a first cavity defined between the outer rim and the inner rim;
    a second damper in communication with the first fluid damper, the second damper comprising a wire mesh; and
    a squirrel cage configured to take up an axial load, the second damper mounted on the squirrel cage,
    wherein the first fluid damper transitions between a working condition in which the first fluid damper dampens vibration of the turbomachine and an interruption condition in which the first fluid damper does not dampen vibration of the turbomachine,
    wherein, during the interruption condition, the wire mesh of the second damper dampens vibration of the turbomachine; and
    wherein the second damper is in parallel configuration with the first fluid damper.

11. The rotor damping device of claim 10, wherein a damper oil is contained within the first cavity and the wire mesh is contained within the first cavity immersed in the damper oil.

12. The rotor damping device of claim 11, wherein the wire mesh is metal.

13. A method for damping vibration of a turbomachine, the method comprising:
    providing a rotor damping device comprising a first fluid damper and a second damper in communication with the first fluid damper, the second damper comprising a wire mesh, the second damper mounted on a squirrel cage configured to take up an axial load, wherein the first fluid damper transitions between a working condition in which the first fluid damper dampens vibration of the turbomachine and an interruption condition in which the first fluid damper does not dampen vibration of the turbomachine; and damping vibration of the turbomachine with the second damper during the interruption condition, wherein the second damper is in parallel configuration with the first fluid damper.

\* \* \* \* \*